UNITED STATES PATENT OFFICE.

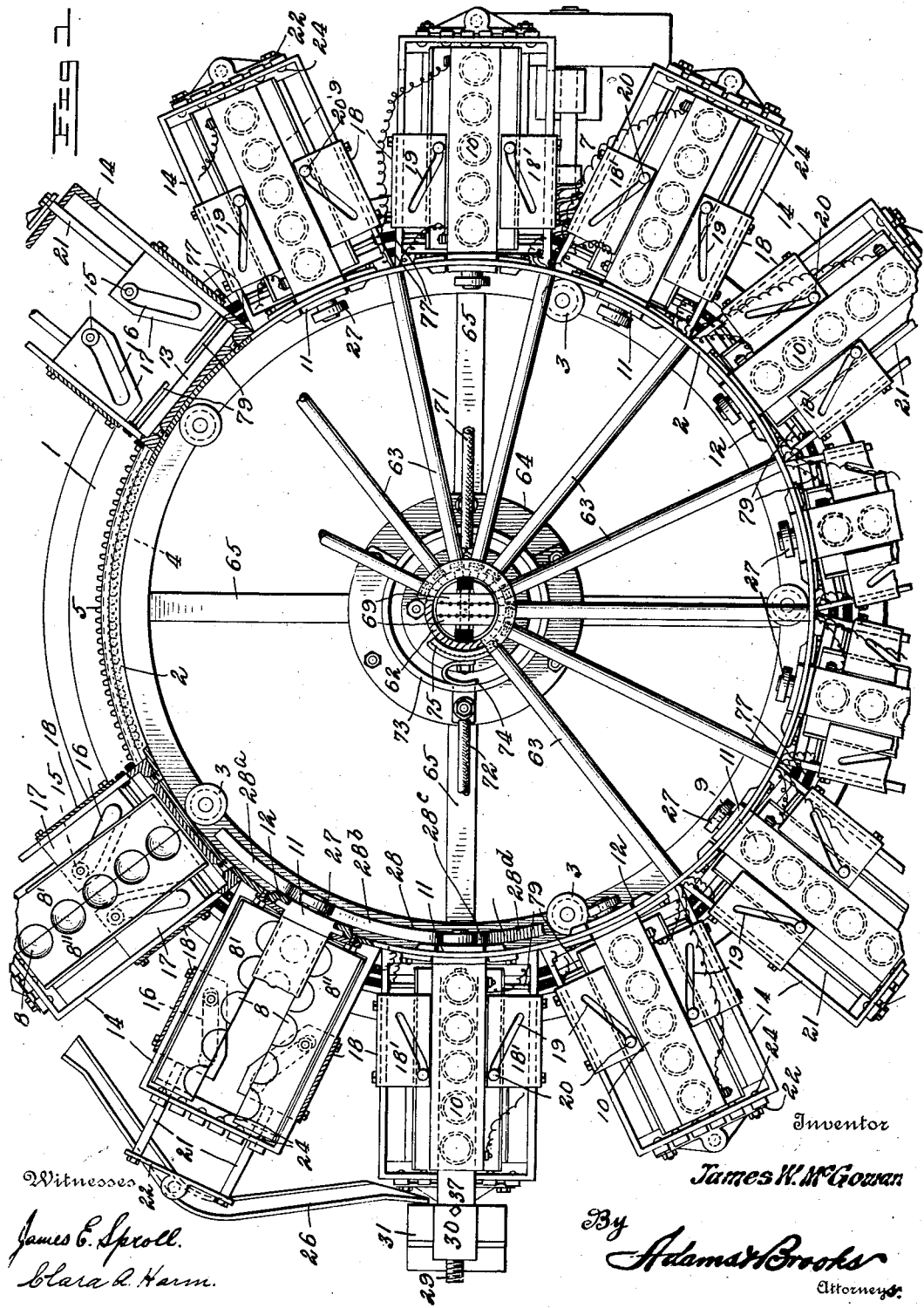

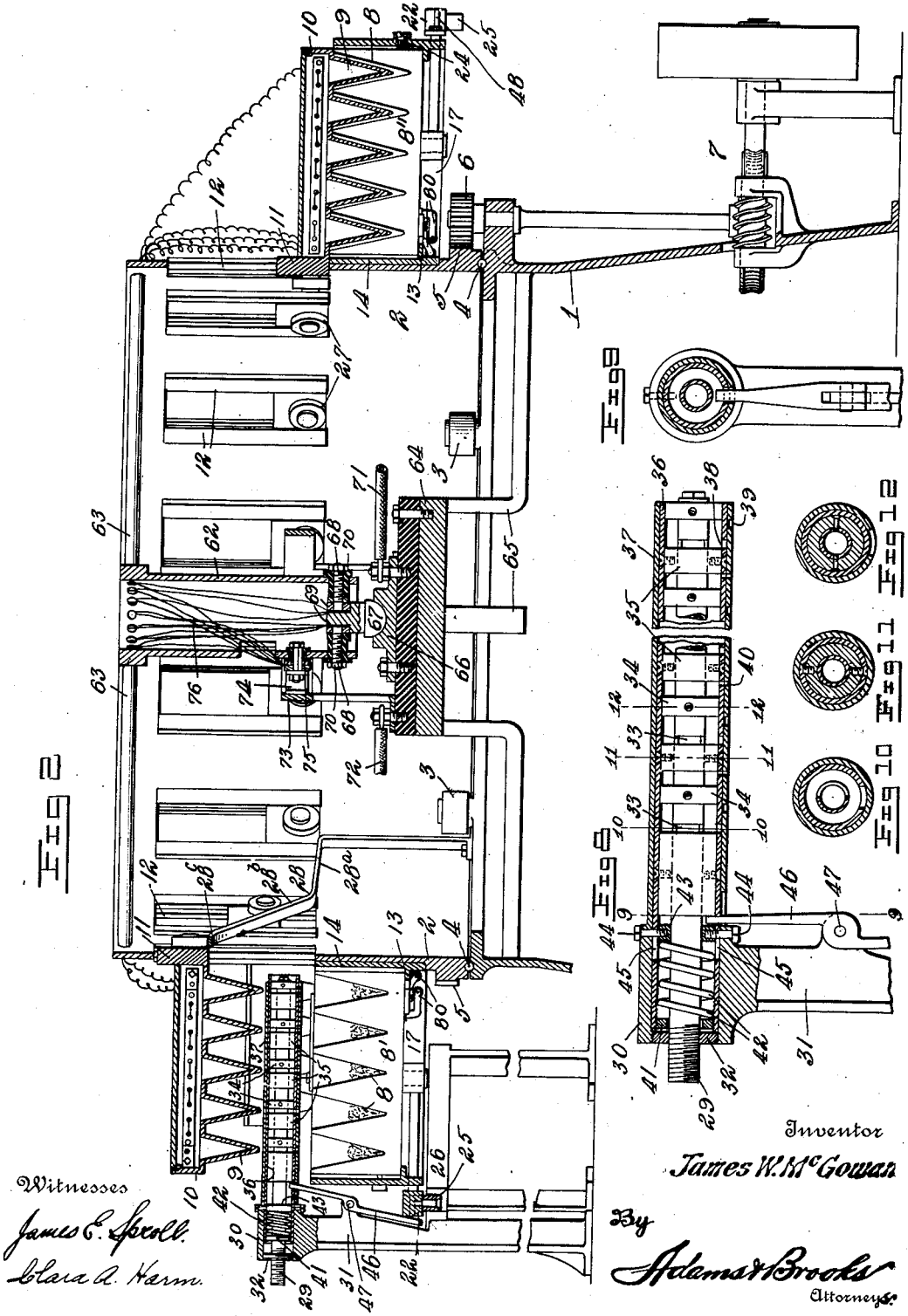

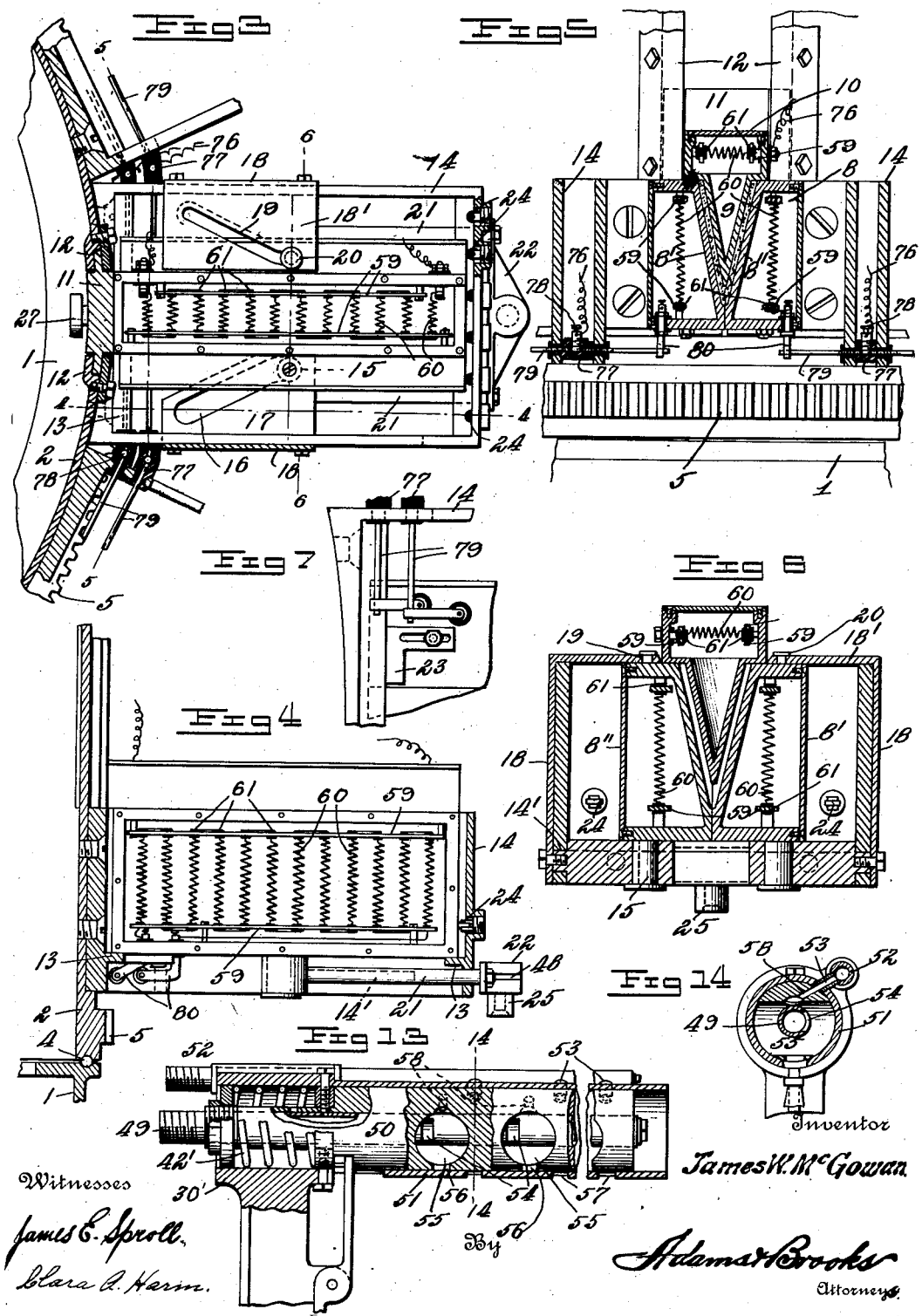

JAMES W. McGOWAN, OF SEATTLE, WASHINGTON.

BAKING-MACHINE.

1,238,544.  Specification of Letters Patent.  Patented Aug. 28, 1917.

Application filed July 18, 1914. Serial No. 851,806.

*To all whom it may concern:*

Be it known that I, JAMES W. McGOWAN, a citizen of the United States of America, and a resident of the city of Seattle, in the county of King and State of Washington, have invented certain new and useful Improvements in Baking-Machines, of which the following is a specification.

The present invention pertains to an improved baking machine embodying novel mechanisms for feeding and molding the raw mixture or batter and delivering the baked product, and it consists in the novel features and combinations of parts as set forth in the following description and defined in the appended claims.

The primary aim of the invention is to provide an automatic baking machine which will produce, from a supply of batter or the like, molded shell-like articles or receptacles and discharge its products.

This and other objects I attain from the machine shown in its preferred embodiment in the accompanying drawings wherein:

Figure 1 is a fragmentary top plan view of my baking machine.

Fig. 2 is a vertical cross sectional view thereof.

Fig. 3 is a top plan of one of the baking devices, parts being broken away to elucidate the construction thereof.

Fig. 4 discloses in vertical section, taken about on line 4—4 of Fig. 3, the construction of the baking device.

Figs. 5 and 6 are cross sectional views taken, respectively, on lines 5—5 and 6—6 of Fig. 3.

Fig. 7 is a fragmentary bottom plan view of one of the baking devices illustrating primarily the electrical connection.

Fig. 8 is a fragmentary longitudinal section of the batter feeding device.

Figs. 9, 10, 11 and 12 are transverse sectional views thereof taken on lines 9—9, 10—10, 11—11 and 12—12, respectively, of Fig. 8, showing more in detail the construction of the feeding device.

Fig. 13 is a longitudinal section of a modified feeding device, parts being omitted and others shown in elevation, and Fig. 14 is a transverse section on line 14—14 of Fig. 13.

Briefly setting forth the construction, there are employed a rotating carrier for supporting a plurality of sectional molds into which the batter is discharged or fed, a core for each mold mounted for elevation clear of the mold to permit of the batter being fed therein and adapted to be subsequently lowered into the mold, a heating medium for baking the batter, and a plurality of means for freeing the baked products from the cores and molds, elevating the cores from the molds, and separating the sections of the latter for depositing the baked products.

Referring by like characters of reference to corresponding parts throughout the several views, 1 designates the base on which the carrier 2 is rotatably mounted, the guide rollers 3 of the base retaining the carrier from lateral displacement while ball bearings 4 interposed between the base and carrier in provided ball races reduce the friction during relative movement. A peripheral rack 5 on the rim of carrier 2 meshes with a pinion 6 of transmission mechanism 7 through which the carrier is rotated.

The baking devices comprise molds 8 and cores 9, the latter being supported on heads 10 which extend outwardly from supports 11 slidable in vertical guides 12 of carrier 2.

Each mold 8 comprises sections 8′, 8″, slidably mounted on ledges 13 of a container frame 14 and from each section depends a follower 15 for engaging in a cam slot 16 of actuator slide 17. The actuators are mounted in slots 14′ of the frames 14 for sliding substantially radially of the carrier 2 and have brackets 18 secured thereto which extend up, outwardly of said frames, and turn inwardly over the mold sections, said inturned end portions 18′ also being formed with cam slots 19 in which engage studs 20 projecting up from said sections. Rods 21, guided in the frames 14, connect the actuators 17 to cross-head 22 whereby on outward movement of the latter, the actuators will effect a sliding movement of the mold sections in opposite directions to open the mold. Reverse movement of the cross-head 22 will close the mold. L-shaped guides 23 on the mold sections engage the inner ledge 13 while rollers 24 mounted in the frame 14 are adapted to guide the outer ends of the mold sections, said rollers and L-shaped guides being adjustable whereby they may be set subsequent to the initial heating of the baking devices to make allowance for expansion of the elements.

A follower 25, on each cross-head 22, is adapted to engage cam track 26 which has draw and thrust portions for opening and closing the mold sections.

Core support 11 is provided with a roller 27 for riding on cam track 28 for raising and lowering the cores 9 from the molds 8. Cam track 28, which is supported on base 1, is composed of a slightly inclined or raised section 28ª, which I term the "pull" or "dislodging" section, an elevating or removal section 28ᵇ, an elevated rest section 28ᶜ and an abrupt lowering section 28ᵈ.

When roller 27 is riding on section 28ᶜ, in which position the cores 9 are spaced upwardly from the molds, the batter or raw mixture is deposited in the latter by the feeding mechanism now to be described.

A supply tube 29, adapted to be connected to a supply source, not shown, is fixed in the bearing 30 of standard 31 by collar 32 and has a series of delivery openings 33 spaced longitudinally thereof. Partition walls 34 are fixed on supply tube 29 in interposed relation to the delivery openings 33, while slidable on the tube are plungers 35 arranged in alternation with the partition walls 34. Plungers 35 are secured to a valve 36 for simultaneous movement, said valve being slidable in casing 37, which extends inwardly from the bearing 30, and is provided with exhaust ports 38 adapted for registration with the delivery ports 39 of said casing. Openings 33, which are normally unobstructed, are closed by the sliding plungers, serving as cut-offs, prior to ports 38 and 39 coming in registering relation to thereby effect a quick discharge of the batter into the continuously moving molds. To relieve the pressure behind the interposed plungers 35 I provide registrable air openings 40 in the valve 36 and casing 37. The valve extends into the bearing 30 and carries an internal collar 41 against which one end of a coiled spring 42 bears, the opposite end receiving support from collar 43 which is held fixed by screws 44 passing through slots 45 of the valve from the bearing. An operating lever 46, fulcrumed at 47 on standard 31, has its upper end projecting through a slot in casing 37 and normally engaging the adjacent plunger for sliding the valve 36 and operating the plungers 35. The lower end of lever 46 is adapted to be engaged by the cam faces 48 of cross-heads 22 for operating said lever.

The operation of the machine thus far described will now be set forth in a concise manner.

The batter feeding device being mounted so as to come between the molds and elevated cores, as shown at the left in Fig. 2, the cam of cross-head 22 engages lever 46 for operating the plungers 35 and valve 36. As the molds pass beneath ports 39, the batter is quickly discharged thereinto and immediately upon clearing the feeding device the cores are lowered quickly into the molds by roller 27 riding down the abrupt cam track section 28ᵈ. The batter is baked during the annular course taken by the baking device. Immediately prior to follower 25 entering cam track 26, roller 27 begins its ride up the dislodging section 28ª of track 28. This slight raise of the cores loosens the same from the baked product but permits of the cores remaining within the shell-like product to aid in freeing the latter from the sections of the mold, which are now starting to separate or open by follower 25 engaging in track 26, should it adhere to one of the sections. Roller 27 then rides up track section 28ᵇ to elevate the cores to permit of a recharge of batter while the mold sections open to deposit the baked product and then close prior to the roller 27 reaching the rest section 28ᶜ. The mold, continuing its movement, travels beneath the feeding device which is operated by cam 48 coming into engagement with the lever 46, as above set forth.

The modified form of batter feeding device shown in Figs. 13 and 14 comprises a batter supply tube 49, a valve 50 slidable thereon and arranged within the casing 51, and fluid or air supply manifold 52 having a series of conduits 53 opening into the casing 51. Tube 49 has discharge openings 54 normally opening into compartments 55 of valve 50 and adapted to be closed by the latter on bringing the ports 56 of the valve into communication with the ports 57 of the casing 51. Valve 50 also has conduits 58 opening into the compartments 55 which are adapted to communicate with conduits 53 when the ports 56 and 57 are in registering relation for admitting air pressure into said compartments to expel the batter. Casing 51 is supported from bearing 30' about which spring 42' coils to retract the valve to its normal position.

The heat for baking is produced by electric heating units comprising, in their simplest form, spaced supporting bars 59 and heating coils 60 insulated therefrom by insulators 61. A heating unit is arranged in each mold section and in each core head 10.

Centrally arranged within carrier 2 is a tubular support 62 from the upper end of which radial conduits 63 extend to the rim of the carrier. A table 64 supported by bracket arms 65 of base 1 carries a cupped contact bearing 66 in which seats a ball contact member 67 insulated from but carried by the tubular support 62. The ball contact 67 is formed at its upper portion into a horizontal bar from the opposite sides of which extend threaded studs 68. Clamping plates 69 are secured against the horizontal bar by nuts 70 on studs 68 for fastening the proper wires to the ball contact 67. The studs 68 extend through apertures in tubular support 62 for supporting the contact. A lead 71 is connected to the contact bearing 66 while the companion lead 72 is metallically connected to a contact annulus 73 supported on the table 64. A brush 74 on support 62 wipes annulus 73 and has the respective wires connected thereto by clamping plates 75.

The current wires 76 pass through the radial conduits 63 to the heating units, those being connected to the core units having sufficient slack to permit of raising and lowering the cores. Interposed between the container frames 14 are pairs of insulators 77 mounted in suitable apertures in said frames. The wires 76, leading to the mold heating units, are connected to binding posts 78 of insulators 77. Terminal rods 79 extend inwardly from the opposite sides of the insulators 77 beneath the mold sections, while the latter carry depending apertured terminals 80 connected to the respective heating units and each having slidable engagement with the respective rod 79 to permit of opening the mold sections.

The foregoing detailed description has been given for clearness of understanding only, and no undue limitation is to be understood therefrom, but the appended claims are to be construed as broadly as is permissible in view of the prior art.

Having thus described my invention, what I claim as new, and desire to secure by Letters Patent of the United States of America, is:—

1. In a baking machine, a rotatable cylindrical carrier vertically slotted, a sectional mold mounted on the outside thereof for sliding opening movement, a core having a part engaging in and projecting through the slot of the carrier for movement therein, and means arranged within the cylindrical carrier and in the path of the projecting part of the core for elevating the latter from between the mold sections.

2. In a baking machine, a rotatable cylindrical carrier provided with a vertical slot, a sectional mold comprising sections mounted on the exterior of the carrier for tangential sliding movement in opening, a core having a part slidably engaging in and projecting through the slot of the carrier, means arranged within the cylindrical carrier to be housed thereby and in the path of the projecting part of the core for sliding the same vertically in said carrier slot, and means arranged outside of the carrier in the path of the mold sections for opening the latter.

3. In a baking machine, a cylindrical carrier rotatably supported on end and formed with a peripheral series of slots, a core extending from the carrier and having a part slidably engaged in each slot thereof, a cam track arranged within the carrier and in the path of the core parts projecting through the carrier slots to slide the former in the latter, a plurality of container frames carried by the carrier beneath the cores, a sectional mold mounted in each frame for sliding opening movement, and means arranged in the path of the mold sections for sliding the same in the container frames.

4. In a baking machine, a rotatable cylindrical carrier provided with a vertical slot and opposing guides at the opposite edges of the slot, a mold on the carrier, a coöperating core for the mold, a core support slidable in the guides and extending through the carrier slot, and means for sliding the support in its guides.

5. In a machine of the character described, a vertically slotted cylindrical support, a mold carried thereby and comprising laterally separable sections, a core slidably mounted in the slot of the support and projecting into the mold between the separable sections, a cam track arranged within the cylindrical support for coöperation with the core and consisting of the slight raise section and an abrupt raise section connected therewith, the slight raise section being adapted for effecting a raise of the core from contact with the molded product but not entirely from projecting therein, and the abrupt raise section being adapted for effecting the entire removal of the core from within the mold, and a second cam track arranged for effecting a separation of the mold sections, said second track starting at a point between the commencement of the slight raise section and the commencement of the abrupt raise section of the first track.

Signed at Seattle, Washington this 4th day of May 1914.

JAMES W. McGOWAN.

Witnesses:
C. E. LONG,
H. M. BROOKS.